US008644520B2

(12) United States Patent
Napoletano

(10) Patent No.: US 8,644,520 B2
(45) Date of Patent: Feb. 4, 2014

(54) MORPHING OF AURAL IMPULSE RESPONSE SIGNATURES TO OBTAIN INTERMEDIATE AURAL IMPULSE RESPONSE SIGNALS

(75) Inventor: Nathaniel Napoletano, Akron, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 468 days.

(21) Appl. No.: 12/904,330

(22) Filed: Oct. 14, 2010

(65) Prior Publication Data

US 2012/0093330 A1 Apr. 19, 2012

(51) Int. Cl.
*H04R 5/02* (2006.01)
*G06F 17/00* (2006.01)

(52) U.S. Cl.
USPC ................................ 381/63; 381/310; 700/94

(58) Field of Classification Search
USPC ................... 381/61, 63, 17, 309–310; 700/94
See application file for complete search history.

(56) References Cited

U.S. PATENT DOCUMENTS

| | | | | |
|---|---|---|---|---|
| 6,519,263 | B1 * | 2/2003 | Huth | 370/444 |
| 2006/0075885 | A1 * | 4/2006 | Bailey et al. | 84/630 |
| 2008/0212788 | A1 * | 9/2008 | Bech et al. | 381/59 |
| 2011/0103620 | A1 * | 5/2011 | Strauss et al. | 381/150 |
| 2012/0101609 | A1 * | 4/2012 | Supper et al. | 700/94 |

* cited by examiner

*Primary Examiner* — Ahmad Matar
*Assistant Examiner* — Katherine Faley
(74) *Attorney, Agent, or Firm* — Schwegman, Lundberg & Woessner, P.A.

(57) ABSTRACT

A system and method include obtaining an aural impulse signature at a first location in a simulated space. An aural impulse signature at a second location in a simulated space is also obtained. Aural impulse signature morphing is applied via a computer to aural impulse signatures of the first and second locations to provide an intermediate aural impulse signature between the first and second locations.

17 Claims, 2 Drawing Sheets

MORPHING OF AURAL IMPULSE RESPONSE SIGNATURES TO OBTAIN INTERMEDIATE AURAL IMPULSE RESPONSE SIGNALS

BACKGROUND

High fidelity, real-time close combat simulation utilizes simulation of an aural environment in order to provide a student with audible cues that alert the student to the student's situation with respect to audible threats and other sound generating entities. For this reason, Three Dimensional (3D) sound simulation has become a part of high fidelity aural modeling, informing the student of his relative position to sound sources, reflective surfaces and room interiors. Even if all of the simulated sound components are generated with the highest fidelity, without modeling the 3D sound field, the acoustical environment will sound artificial and lack critical positional cues. An increasingly popular technique for simulating the aural effects created by 3D positioning of sound source, listener and reflective surfaces is convolution reverberation. Convolution reverberation has become popular over the last five years because of its high fidelity and the resulting ease of creating acoustic databases. These databases contain a set of recordings called impulse signatures that represent the aural characteristics or ambience of locations in space outside or within a room.

All physical systems respond to an impulse by resonating at their natural frequencies. The character of these resonances defines a unique aural signature for that space and the configuration of players within that space. A recording of that signature can be made. The aural signature of that space and the players can later be recreated and applied to a target audio stream that has no acoustical character of its own, by convolving the recorded impulse signature with the new target audio stream. The convolution is usually carried out by performing Fast Fourier Transforms (FFT) on the signal and impulse, multiplying their spectra, and performing the Inverse FFT (IFFT). Convolution reverberation creates the highest fidelity reverberation effect obtainable at present.

SUMMARY

A method includes obtaining an aural impulse signature with the listener and sound source in a first configuration in a simulated space. An aural impulse signature at a second configuration in a simulated space is also obtained. Aural impulse signature morphing is applied via a computer to aural impulse signatures of the first and second configurations to provide an intermediate aural impulse signature between the first and second configurations.

In one embodiment, a computer implemented method includes obtaining aural impulse signatures on both sides of a current user configuration in a simulation from a computer readable storage device, applying aural impulse signature morphing via the computer to the aural impulse signatures to provide an intermediate aural impulse signature stored on a computer readable storage device corresponding to the current user configuration, and performing convolution reverberation via the computer using the intermediate aural impulse signature to generate a sound representation corresponding to the user in the current user configuration.

A system includes a simulator to provide a current configuration in a space being simulated. A morphing engine is coupled to receive the current configuration and obtain aural impulse signatures corresponding to two configurations on either side of the current configuration. The morphing engine applies aural impulse signature morphing to the aural impulse signatures of the two configurations to provide intermediate aural impulse signatures corresponding to the current configuration.

DETAILED DESCRIPTION

Figure 1:
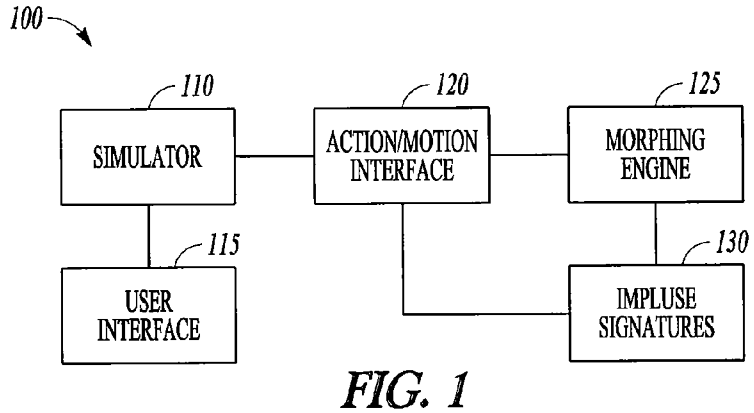
FIG. 1 is a block diagram of an aural simulation system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Recording studio equipment has been available since the 1990s that simulates a reverberant space using convolution. In every case, the studio equipment uses a static impulse signature file since the users are only interested in placing a musical instrument in a static stereo image and the manufacturers of convolution reverberators have never been motivated to increase the complexity of their equipment. In fact, most of the studio equipment will not tolerate a change to the impulse file while processing a sound stream and may mute the output sound or even make a horrible loud groan until a new electronic configuration becomes stable.

Current convolution reverberation techniques do not support real-time close combat simulation because current impulse signature databases and convolution algorithms are not designed to support motion of the student listener or the simulated sound source.

In order to simulate an immersive Individual Combat (IC) environment, a convolution reverberator must use a dynamic aural impulse signature. A simulated aural effect of the changing ambient conditions that a listener will experience when moving within reverberant spaces during simulated IC training is provided. Examples include the aural experiences of a foot soldier who runs from an open field into a building or of a driver who pulls his utility vehicle up along the side of a dump truck.

Several algorithms in various embodiments allow software to dynamically blend, or morph, two or more aural impulse signatures simulating the effect that a listener would experience when moving around in a reverberant space. In one embodiment, a computationally efficient impulse morphing technique is based on simple cross-fading between aural impulse signatures that correspond to the movement through the reverberant space. This produces satisfactory results if the impulse samples are taken with close spacing.

In a further embodiment, a high fidelity impulse morphing technique is referred to as reflection identification.

The sound that a listener experiences in a reverberant space consists of the original articulation followed by distinct early reflections. Each early reflection mimics the onset of the original articulation and is the result of the sound pressure wave reflecting off of the floor and other large surfaces. After time has elapsed, the listener will have heard several of these early reflections. Then the reflections become more numerous and closely spaced as sound pressure waves continue to bounce around the space. At this time, individual reflections can no longer be detected and the listener experiences a decaying reverberant field.

Major early reflections are categorized within the aural impulse signatures being morphed and transitioned into each other in time and amplitude. Yet a further embodiment is referred to as smart fading, which blends simple fading with some enhancement, and "Bayesian Morphing" which makes use of Bayesian network technology. These techniques provide varying degrees of fidelity and computational load.

Impulse morphing enables the environmental sound simulation to make use of convolution reverberation to provide a high fidelity 3D sound field technique. Impulse morphing combined with convolution reverberation also creates the opportunity to rapidly create 3D sound environment databases by making impulse recordings (impulse files) from the field without detailed programming and engineering review.

The following description starts with a summary of the acoustical phenomena that provide aural cues, and also describes the difficulty realized by the inventor in capturing sufficient data to accurately represent sound in a simulation of a space and a configuration of listeners and sound sources within that space. This is followed by a description of several embodiments that address the difficulties.

Acoustical Phenomena.

There are several types of acoustical phenomena that support a user's ability to localize sound sources and map a local environment. The phenomena, when simulated correctly, work with the visuals to produce a high fidelity virtual experience:

1. Interaural time difference
2. Head shadow
3. Pinna response
4. Chest and shoulder echo
5. Early echo response and reverberation Interaural time difference is the offset or difference in time between sounds arriving at the left and right ears. This offset ranges from 0 for a sound source directly in front of us to about 60 milliseconds for a sound source at our right or left. Our ability to detect and utilize this delay or phase offset makes it the most important cue in determining the azimuth of a sound source with respect to our heads. In practice, introducing a phase delay between a sound being played through a listener's earphones will create a convincing sense that the sound is emanating from some particular position in space around the listener. This is a standard technique used in stereo musical recordings.

Head shadow also helps a user determine azimuth, Head shadow is the effect perceived when a sound is emanating from a source at our side and the sound has to travel around our head to reach the occluded ear. The sound in the occluded ear is attenuated and devoid of high frequency content (softer and duller).

Pinna response describes the ability to detect the position of a sound source from different angles around the auditory canal of each ear. The frequency content of sound entering our ears is affected differently depending on what part of the pinna is transverse giving us the ability to estimate elevation as well as azimuth.

Chest and Shoulder echo is indirect sound that we hear reflected from our chest and shoulders as opposed to the sound received directly into our ears. This effect also serves as a minor cue, informing us of the directionality of the sound source.

Early echo response and reverberation is indirect sound that we hear reflected from the surfaces and objects surrounding us. Much of the sound that we hear is reflected from walls, the floor and ceiling and other surfaces. Outdoors, loud sounds are reflected from the boundaries between air layers, buildings and mountains. Humans use a skill referred to a spatial cognition by cognitive psychologists. We use the information contained in the reflected sound to build our cognitive maps of our surroundings. It's a sophisticated skill and not well understood by audiologists.

Because of our ears' horizontal placement, we are best at detecting the azimuth of a sound source compared to the elevation. It's worth mentioning that we regularly "game" the system to improve our auditory perception by using finesse. As listeners, we are rarely required to remain still, and we typically don't. Tilting one's head provides a slight variation form an original sound signal, changes the effect of head shadow and may tilt to a more accurate azimuth sensing faculty upright to provide better elevation data. This new data, correlated with the original perceived sounds provides a better map of reality.

Range Cues. Our ability to estimate range is worse than our sense of azimuth and elevation. There are several types of acoustical phenomena that support our ability to discern the range of a sound source. Simulation of these effects is all necessary in a high fidelity training system:

1. Loudness
2. Head angle parallax
3. Interaural Level Difference (ILD) change
4. Ratio of direct to reverberant sound Loudness is positively correlated with closeness. The acoustical energy contained in a sound pressure wave decreases with the square of the distance from the sound source as the energy spreads out over increasing space. As infants we learn that talking people and noisy objects are loud in our faces and become softer as they move away. We quickly learn to exploit this phenomenon to estimate distance. Typically, we need knowledge about the sound source (how loud do we expect the object to be) in order to estimate range in this way.

Head angle parallax is the change we hear in a sound field when we listen to it from different head rotation angles. And it's a function of distance. Here is another instance where adjusting ones head position will provide more environmental information. If we rotate our head's slightly on our necks, we will place one ear forward and one back as well as skewing the pinna compared to the first position. The sound we hear sourced or reflected from close objects will change more than sound from objects at a distance.

ILD change occurs when a sound source is auditioned from different ranges. If a sound source is to our side, head shadow will attenuate the sound entering the opposite ear. This effect is more prominent when an object is close to us and becomes less noticeable with a distant object. A person whispering into an ear or a close flying insect is easily detectable as close. We typically perceive sounds heard only in one ear as a threat.

The ratio of direct to reverberant sound is a function of our distance to the sound source. The acoustical energy contained in a directly radiating sound pressure wave decreases with the square of the distance, but this is not true of the reverberant field created when the sound pressure wave reflects from objects several times. We have the ability to compare the direct sound to the reflections and assess the positions of the sound source and other objects. When someone shouts to us from another room, we hear only reflections and can detect the fact that they are in another room.

Reverberation, sometimes referred to as reverb, is the persistence of reflected sound in a space after the original sound source becomes muted. Reverb is caused by repeated echoes bouncing from surface to surface within that space.

The first few echoes are sparse and are referred to as the early reflections. Later, the echoes become more numerous and blend together into a drone. This portion of the reverberation effect is referred to as the decaying reverberation or reverb. Eventually, a reverberation perceived in a space looses energy and dies out as the sound is absorbed by the walls and air.

The character of the reverb effect is an important consideration in the design of public spaces, theaters, concert halls and churches. The science of architectural acoustics was built around our understanding of reverberation, materials and noise control within buildings. This science explains and exploits the tendencies of various materials to absorb and reflect sound. Reverberation time is directly related to absorption and reflection. One property of a material is its tendency to absorb and reflect sound with varying efficiencies as a function of frequency. This creates a reverberant field where certain frequencies decay at a faster rate than others. This behavior of a reverberant space allows a listener to gather further information about his surroundings and becomes an important cue.

A person talking with someone in a coat closet would be aware of acute high frequency absorption compared to a conversation in a public restroom where all frequencies are reflected efficiently by the hard dense tile.

Most of our aural experience is reverberant. We are typically unaware of how much reflected sound we hear compared to direct path sound. If we enter an anechoic chamber (a room designed to produce no reflections from any surface) you would be unable to hear a person shouting at you unless he is facing directly at you.

The reverberant field is responsible for producing the majority of aural effects that support spatial cognition. Among the listed acoustical phenomena that support localization, ranging and spatial mapping, chest and shoulder echo, early echo response and the ratio of direct to reverberant sound are direct results of reverberation.

Motion parallax, interaural time difference, head shadow, pinna response, loudness and ILD change are attenuating and low pass filtering phenomena that are indirectly related to the sound field of a space and become entangled with the spatial modeling as explained in the next section.

Decay time, damping and early reflection are important and hugely control the psycho acoustical effect of the reverberation. Decay time, often defined as the time it takes for the reverberant sound field to drop to −60 dB with respect to the muted sound source, is a measure of how reflective a space is. The decay time can range from 0.1 seconds in your living room to several seconds in a church. Typically, the greater the size of the space, the longer the decay time. A listener can use his perception of decay time and prior knowledge of various sound sources to determine the size and materials of his room, or whether he is in a room at all.

Because of the important information carried in the early reflections, most modern reverb effects units allow the engineer to control the early reflections separately. Changing this parameter will change a listener's perception of the size of his space (indoors or out), the number of walls or the one's placement within the space, the presence of objects. Often a studio effects unit will allow the engineer to dial up the early reflections with parameters such as room size and room type.

Most high fidelity reverb effects units let you adjust the decay time as a function of frequency. This simulates the effects of being surrounded by different materials. A blindfolded listener can easily tell you if he is standing on grass, carpet or concrete based on the effects of damping on your voice.

The traditional division of control parameters in studio effects processors arose because they allow flexible control of the reverberation effect. Identical or similar control mechanisms are employed in consumer 3D games and sound libraries. The reason that these parameters are chosen traditionally and will probably remain is because they create natural divisions that correlate to real world physical properties and real information categories that our brains use while mapping our environment.

The reverberation decay time, early reflections and damping inform us of the size and shape of our room or space the possible presence of objects and the types of materials around us. Depending on the nature of the damping, we can detect the amount and locations of the sound absorbing objects.

In total darkness, if the early reflections are delayed and the decay time is long we are probably aware that we are in a cavern. If the early reflections return to us sooner but the decay time remains long, we may believe that we are in a gymnasium. If the early reflections are shorter the space may sound like a basement with cinder block walls and a concrete floor.

If the early reflections remain the same but the decay time is reduced we may correctly predict that the floor is carpeted and drapery and furniture are present.

The nature of the early reflections will inform us of the shape of the space. A hallway will have one persistent early reflection that traveled the length of the hallway and informs us that the room is long and thin. If a person silently sneaks up behind you while your feet are making footstep sounds, you will suddenly be aware that the early reflections from the back wall are being blocked, and a filtered quicker echo is bouncing off of a clothed human.

Difficulties in Simulating Acoustical Phenomena and Various Embodiments.

Mathematically, convolution is an operation on two functions f1 and f2, producing a third function f3 containing special properties of one of the original functions with modifications from the second. Typically, f1 is larger in amplitude and bears the closest resemblance to the result f3. In one embodiment, aural effects are created by convolving a "dry" source signal (a direct signal void of any reflections) f1 with an Impulse Response Function (IRF) sampled from the physical space being simulated. The IRF of a system is its output when presented with an impulse.

The IRF is a recording of the echoes derived from a location such as a concert hall, back ally, or any other space to be simulated, when the location is excited by an acoustical impulse. The IRF recording is typically saved digitally as an impulse file and provides a record of the dynamic behavior of the space under controlled conditions. Convolution is then used to calculate how that location would respond if it were excited by an arbitrary signal or sound (f1).

Convolution, in one mathematical operation, captures the major physics that define a reverberant space, reverberation, range attenuation, filtering, and phasing. Another benefit of the impulse convolution method is the ease with which the impulse file can be obtained. In theory, an IRF is merely a recording of the reverberation produced in an acoustic location when excited by an acoustical impulse. Production costs are minimal, because audio engineers can obtain an impulse file from an acoustical space as easily as snapping a picture.

In practice, an ideal impulse is impossible to create, but this is only an inconvenience. An approximate impulse produced by a loudspeaker may be adequate. Alternately, other waveforms and signals can be used to excite a reverberant space and later processed mathematically to reveal the IFR.

The inventor recognized that while convolution reverberation simulation has become the high fidelity standard in the recording studio where a musician and a listener are placed in a stereo field and never move during the course of a 4 minute song or 12 minute sonata, the soldier or avatar in a 3D game is hardly going to stand still. Sound sources, trucks and snipers, will be moving as well.

The impulse file, also referred to as an aural impulse signature, is a snapshot in time. It depends on the impulse source and impulse recorder being stationary for the length of the reverberant decay. The recording captures the sound character of space and relationship of the source and listener for one and only one configuration, the configuration containing the distances and directionalities of the state in which the impulse recording is made.

The simplest way, in theory, to allow for motion is to make a series of impulse recordings representing every possible configuration of listener and sound source. Appropriate impulse files selected from this series could then be used in sequence to represent continuous motion in the same way that continuous motion is simulated using sequential still photographs in a motion picture. But in practice, how many impulse recordings would we need to obtain in order to simulate close combat in a small parking lot?

Unlike a motion picture, the audio problem is multidimensional. Aural impulse databases must take the form of a multidimensional array supporting 6 independent parameters, degree of listener head azimuth, listener head position, degree of listener body azimuth and sound source position and sound source directionality for a listener in a simulation. The impulse file set representing this can be considered a 6 dimensional array and the number of individual impulse files required can be calculate by taking the product of the 6 dimensions.

The brute force solution to this problem results in each of these dimensions being sampled with enough granularity so that the variation of the timbre between samples is imperceptible. The six dimensional aural impulse array will be filled with the entire set of impulse signatures which can then be used in convolution with a source sound file for each position of the user during a simulation.

An impulse file count calculation may be based on the estimated size of these dimensions. The rationale is as follows:

Head Azimuth—ignoring the effects of elevation and simplifying the simulation to include only sound sources that are arranged around the player (no aircraft). Experiments show that a delta of slightly more than 3 degrees is the smallest detectable change in head azimuth. This finding will require us to produce 120 impulse file recordings to encapsulate the experience of turning one's head 360 degrees while all other conditions remain unchanged.

Body Azimuth—with the same assumption as above, the player is expected to walk erect, but can turn his body and head freely around an axis traveling the length of his upright spine. Again using 3 degrees as the smallest detectable change in body azimuth requires us to produce 60 impulse file recordings for each head azimuth position (assuming 90 degrees of body twist right and left).

Player Position—experimentation has shown that a delta of slightly more than 6 inches is the smallest detectable change in horizontal position. Assuming that the player can travel freely around a 150 ft×300 ft parking lot, the number of impulse files required to simulate the space will be 300 in the North-South direction times 600 in the East-West or 18,000 files Sound Source Position—extrapolating from the same experiments used to measure horizontal player position requirements, 18,000 recordings will be necessary. The result generated when these numbers are used in equation 1 is:

Desired impulse space=300×600×300×600×120×60=2,332,800,000,000. This result, although a large number, may not be prohibitive in a modern computer system since the impulse files are rather small. The problem belongs to the team assigned to make 2 trillion field recordings. Even if automated, the recordings would be made sequentially, which would take thousands of years. So regardless of the progress in computer technology, in reality, it is difficult if not impossible to create a desired impulse space for a simulation.

In one embodiment, interpolation is performed between impulse files made at larger angles and greater spacing than that desired for accurate simulation to provide a desired impulse space. Simple interpolation may be problematic in some simulations where a file comprises a set of hills and valleys that change in an unpredictable way as the listener and sound source are moved. A sound reflection from Northern brick wall may move out in time as the listener moves south, but a reflection from the side of Southern truck may cross the first reflection in time moving the other way. Combining impulse files in any unintelligent way, even with mathematical precision, may result in a muddy mess that destroys the 3D information that is desired.

In one embodiment, early reflections are tracked, and adjustments made to their amplitude and positions. Only the first several early reflections are used in one embodiment as it appears that a human perceiver only tracks the first few. The remaining reflections after early reflections are perceived to blend together into the reverberant field.

In one embodiment, a technique termed impulse morphing is used to create intermediate aural impulse signatures from two measured aural impulse signatures. In effect, the two aural impulse signatures are morphed or smoothly evolved from one to the other, resulting in multiple intermediate aural impulse signatures to provide a full desired impulse space. Impulse morphing provides real-time, multidimensional morphing between two measured aural impulse signatures. An impulse file is generated by morphing the relevant source impulse files selected from impulse space based on the six dimensions.

Impulse morphing is easier and more amenable to automation than image morphing because fewer morph points are required. The morph points in one embodiment are used to only mark early reflections. Tracking more than five reflections is may be unnecessary. In one embodiment, three points or reflections are typically adequate to produce high fidelity results and often, no more than three reflections can be identified.

Once the morph points are identified, the actual process of performing the morph calls for handling two types of data, the early reflections and the reverberant field, in different ways. The early reflections receive the most care. The reverberant field will only change slightly between sample points and a simple cross-fade between the reverberant field data of several impulse files will produce a high fidelity perception of the spaces size and materials.

The early reflections in one embodiment are tracked and time-shifted since they represent particular objects of interest within the student's cognitive special map. The student is aware of the close objects and walls and is expecting them not to jump unless that is an intended part of the simulation. So the position and amplitude or these reflections must transition smoothly.

The reflections represented in the impulse file can be treated as a packet, usually no more that a millisecond in length. Once identified and related to the mating packets in the morphing impulse files, the position and amplitude of each reflection packet can be interpolated with simple math. Within the packet, points are stretched and shrunk as necessary to produce a smooth transition.

As the packets are moved, spaces and residual data are created in the remaining impulse file as the packet is slid forward and backward in time in the same way that tears and bunched up doe lumps become a problem when a novice tries to stretch out a rectangular pizza shell by hand.

In one embodiment, the missing data holes may be patched with the residual data. Care is taken not to create a jump discontinuity, but there is standard software available within many audio editing programs that take care of this automatically. Care is also taken to ensure that the RMS energy of the fill data is similar to the surrounding data since it was taken from a different place in the impulse file. This adjustment can also be made automatically with standard software.

If one did decide to perform the morphing calculations off-line, this would be possible using the methods described above. Doing this would keep the number of impulse file field recordings within reach and still provide the necessary smooth transitions.

FIG. 1 is a block diagram of an aural simulation system 100 according to an example embodiment. A simulator 110 contains programming to simulate a battle field with a person or listener moving through the battle field. Simulator 110 may be a game in which a player moves through a virtual space, or it may be integrated into or in communication with a headset for a user, as they move through a real space populated with images and sound through the headset as indicated by user interface 115. In the case of a game, a simple display may be provided with headsets, or audio system suitable to simulate a three dimensional audio experience. In the case of a headset, a head up display and audio headphones may be provided to deliver simulation content to the user via the simulator 110.

In one embodiment, the simulator 110 provides motion and position information to a motion position interface 120. The motion and position information provides data to indicate current and next position information to a morphing engine 125. Morphing engine 125 is coupled to receive aural impulse signatures from an aural impulse signature database 130 as a function of the current and next positions.

Morphing engine 125 determines, based on the current and next location information, including multi-dimensional position information regarding a listener in the simulation, and source of the sound or sounds. In one embodiment, the simulator provides multi-dimensional information regarding degree of listener head azimuth, listener head position, degree of listener body azimuth, sound source position and sound source directionality for a listener in the simulation. This may be referred to as a configuration in one embodiment. The morphing engine 125 then receives aural impulse signatures on either side of the listener with the same configuration and interpolates between them to arrive at an intermediate aural impulse signature corresponding to the actual location and other multi-dimensional information (configuration) corresponding to the listener in the current location in the simulation. As the listener moves, the interpolations continue, with the same aural impulse signatures if the listener is moving along a line between them, or one or more new aural impulse signatures on either side of the listener in the next location.

In one embodiment, the actual location is used to select two aural impulse signatures on either side of the actual location. Morphing is then applied to the images to arrive at an intermediate aural impulse signature. In a further embodiment, the two aural impulse signatures are selected as corresponding to a current and next location of the listener in the simulation, and morphing is performed to provide multiple intermediate aural impulse signatures corresponding to intermediate positions of the listener as they move between the two points.

In one embodiment, the simulator 110 obtains the aural impulse signatures from the morphing engine and performs convolution reverberation to provide sound corresponding to a listener moving from the current to the next location.

In further embodiments, the morphing engine 125 identifies morph points in the current and next aural impulse signatures corresponding to early reflections, identifies corresponding data packets in the aural impulse signatures, and interpolates between morph points in the packets.

As described above, the morphing engine 125 moves packets in time and patches missing data holes with residual data while adjusting RMS energy to be consistent with surrounding data. Up to three morph points are identified in one embodiment.

Figure 2:
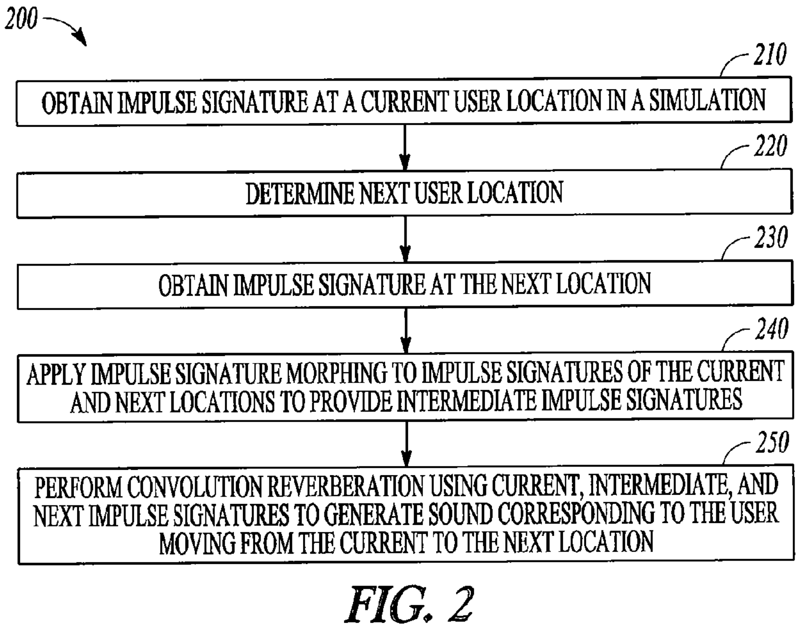
FIG. 2 is a flowchart illustrating a method of convolution reverberation including aural impulse signature morphing according to an example embodiment.

FIG. 2 is a flowchart illustrating a method 200 of convolution reverberation including aural impulse signature morphing according to an example embodiment. At 210, an aural impulse signature is obtained at a current user location in a simulation. At 220, a next user location is determined and at 230, an aural impulse signature at the next location is obtained. At 240, aural impulse signature morphing is applied to aural impulse signatures of the current and next locations to provide one or more intermediate aural impulse signatures for use in convolution reverberation of sound for locations between the current and next locations as indicated at 250.

Figure 3:
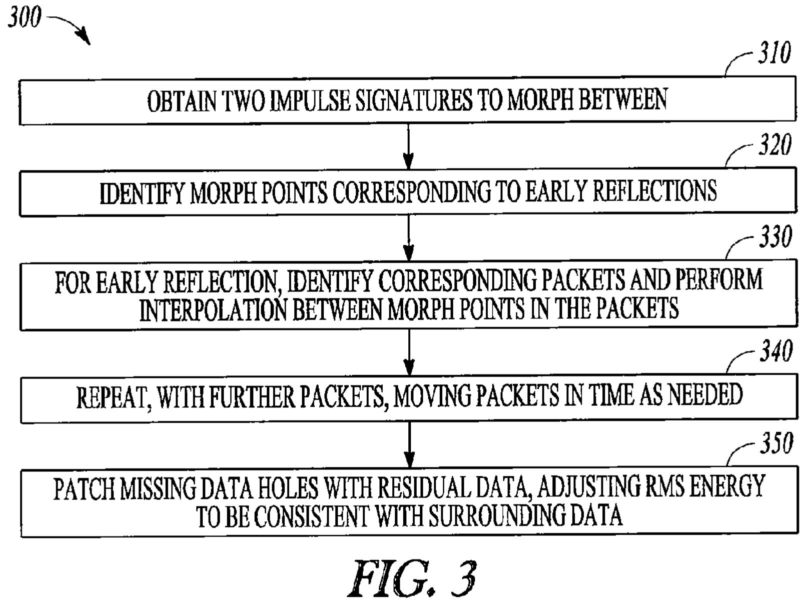
FIG. 3 is a flowchart illustrating aural impulse signature morphing according to an example embodiment.

FIG. 3 is a flowchart illustrating aural impulse signature morphing 300 according to an example embodiment. At 310, two aural impulse signatures are obtained. The aural impulse signatures may correspond to current and next locations of a listener in a simulation. In a further embodiment, the current and next locations correspond to locations of collected aural impulse signatures and may be selected based on a location of a listener being simulated that lies between locations of two aural impulse signatures that were obtained by measuring sound at various locations and orientations prior to running the simulation.

At 320, morph points corresponding to early reflections are identified. As indicated above, up to three or more morph points may be identified corresponding to up to three or more early reflections of sound. At 330, corresponding packets of data in the aural impulse signatures are identified and an interpolation is performed between the morph points in the packets. The process is repeated as indicated at 340, with further packets. The packets are moved in time as needed to correspond to the actual location in the simulation. At 350, missing data holes created by such movement are patched with residual data. The RMS energy of the residual data is adjusted to be consistent with surrounding data.

Figure 4:
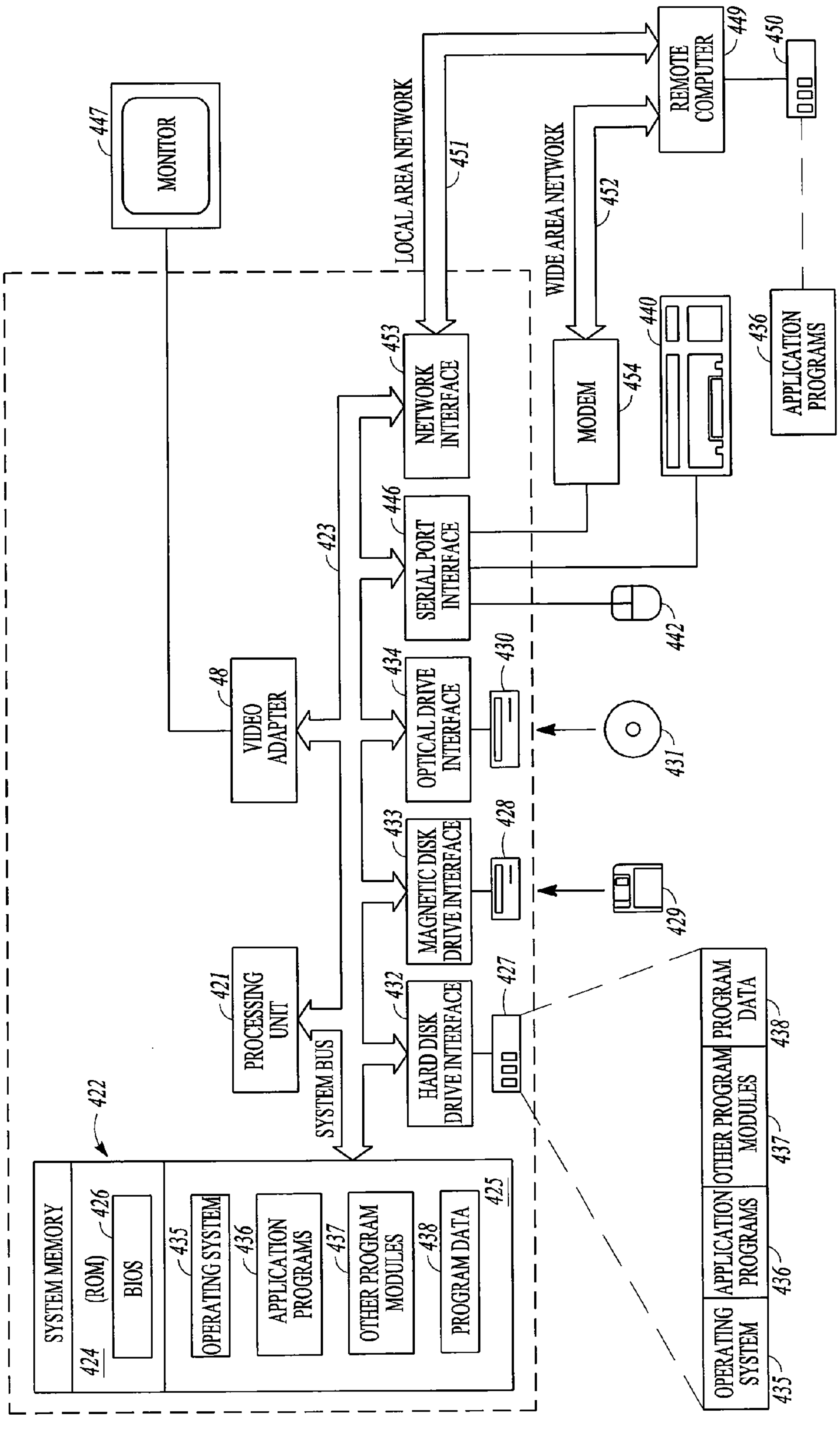
FIG. 4 is a flowchart of an example computer system for implementing one or more example embodiments.

A block diagram of a computer system that executes programming for performing method associated with example embodiments is shown in FIG. 4. As shown in FIG. 4, one embodiment of the hardware and operating environment includes a general purpose computing device in the form of a computer (e.g., a personal computer, workstation, or server), including one or more processing units 421, a system memory 422, and a system bus 423 that operatively couples various system components including the system memory 422 to the processing unit 421. There may be only one or there may be more than one processing unit 421, such that the processor of the computer comprises a single central-processing unit (CPU), or a plurality of processing units, commonly referred to as a multiprocessor or parallel-processor environment. In various embodiments, the computer is a conventional computer, a distributed computer, or any other type of computer.

The system bus 423 can be any of several types of bus structures including a memory bus or memory controller, a peripheral bus, and a local bus using any of a variety of bus architectures. The system memory can also be referred to as simply the memory, and, in some embodiments, includes read-only memory (ROM) 424 and random-access memory (RAM) 425. A basic input/output system (BIOS) program 424, containing the basic routines that help to transfer information between elements within the computer, such as during start-up, may be stored in ROM 424. The computer further includes a hard disk drive 427 for reading from and writing to a hard disk, not shown, a magnetic disk drive 428 for reading from or writing to a removable magnetic disk 429, and an optical disk drive 430 for reading from or writing to a removable optical disk 431 such as a CD ROM or other optical media.

The hard disk drive 427, magnetic disk drive 428, and optical disk drive 430 couple with a hard disk drive interface 432, a magnetic disk drive interface 433, and an optical disk drive interface 434, respectively. The drives and their associated computer-readable media provide non volatile storage of computer-readable instructions, data structures, program modules and other data for the computer. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 429, optical disk 431, ROM 424, or RAM 425, including an operating system 435, one or more application programs 436, other program modules 437, and program data 438. Programming for implementing one or more processes or method described herein may be resident on any one or number of these computer-readable media.

A user may enter commands and information into the computer through input devices such as a keyboard 440 and pointing device 442. Other input devices (not shown) can include a microphone, joystick, game pad, satellite dish, scanner, or the like. These other input devices are often connected to the processing unit 421 through a serial port interface 446 that is coupled to the system bus 423, but can be connected by other interfaces, such as a parallel port, game port, or a universal serial bus (USB). A monitor 447 or other type of display device can also be connected to the system bus 423 via an interface, such as a video adapter 448. The monitor 447 can display a graphical user interface for the user. In addition to the monitor 447, computers typically include other peripheral output devices (not shown), such as speakers and printers.

The computer may operate in a networked environment using logical connections to one or more remote computers or servers, such as remote computer 449. These logical connections are achieved by a communication device coupled to or a part of the computer; the invention is not limited to a particular type of communications device. The remote computer 449 can be another computer, a server, a router, a network PC, a client, a peer device or other common network node, and typically includes many or all of the elements described above I/0 relative to the computer, although only a memory storage device 450 has been illustrated. The logical connections depicted in FIG. 4 include a local area network (LAN) 451 and/or a wide area network (WAN) 452. Such networking environments are commonplace in office networks, enterprise-wide computer networks, intranets and the internet, which are all types of networks.

When used in a LAN-networking environment, the computer is connected to the LAN 451 through a network interface or adapter 453, which is one type of communications device. In some embodiments, when used in a WAN-networking environment, the computer typically includes a modem 454 (another type of communications device) or any other type of communications device, e.g., a wireless transceiver, for establishing communications over the wide-area network 452, such as the internet. The modem 454, which may be internal or external, is connected to the system bus 423 via the serial port interface 446. In a networked environment, program modules depicted relative to the computer can be stored in the remote memory storage device 450 of remote computer, or server 449. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) is submitted with the understanding that it will not be used to interpret or limit the scope or meaning of the claims.

The invention claimed is:

1. A method comprising:

obtaining an aural impulse signature at a first location in a simulated space;

obtaining an aural impulse signature at a second location in a simulated space;

applying aural impulse signature morphing via a computer to aural impulse signatures of the first and second locations to provide an intermediate aural impulse signature between the first and second locations;

wherein applying aural impulse signature morphing comprises:

identifying morph points in the first and second aural impulse signature corresponding to early reflections;

identifying corresponding packets; and interpolating between morph points in the packets.

2. The method of claim 1 and further comprising performing convolution reverberation of simulation sound using the intermediate aural impulse signature to generate a sound representation via audio headphones corresponding to a listener in the simulation at a location corresponding to the intermediate aural impulse signature.

3. The method of claim 1 wherein applying aural impulse signature morphing further comprises:

with further packets, moving packets in time as needed; and patching missing data holes with residual data, adjusting RMS energy to be consistent with surrounding data.

4. The method of claim 1 wherein multiple morph points are identified.

5. The method of claim 1 and further comprising identifying a reverberant field as diminishing reflection occurring after early reflections.

6. The method of claim 5 and further comprising using a cross fade on the identified reverberant field.

7. A computer implemented method comprising:

obtaining aural impulse signatures on both sides of a current listener location in a simulation from a computer readable storage device;

applying aural impulse signature morphing via the computer to the aural impulse signatures to provide an intermediate aural impulse signature stored on a computer readable storage device corresponding to the current user location; and performing convolution reverberation of simulation sound via the computer using the intermediate aural impulse signature to generate a sound representation corresponding to the listener at the current listener location, wherein applying aural impulse signature morphing comprises:

identifying morph points in both aural impulse signatures corresponding to early reflections;

identifying corresponding packets; and interpolating between morph points in the packets.

8. The method of claim 7 wherein the method is performed real time during a simulation in which a user moves.

9. The method of claim 8 wherein each aural impulse signature comprises a multidimensional array that represents degree of listener head azimuth, listener head position, degree of listener body azimuth, sound source position and sound source directionality for a listener in the simulation.

10. The method of claim 7 wherein applying aural impulse signature morphing further comprises:

with further packets, moving packets in time as needed; and patching missing data holes with residual data, adjusting RMS energy to be consistent with surrounding data.

11. The method of claim 7 wherein multiple morph points are identified.

12. A computer implemented method comprising:

obtaining aural impulse signatures on both sides of a current listener location in a simulation from a computer readable storage device;

applying aural impulse signature morphing via the computer to the aural impulse signatures to provide an intermediate aural impulse signature stored on a computer readable storage device corresponding to the current user location;

performing convolution reverberation of simulation sound via the computer using the intermediate aural impulse signature to generate a sound representation corresponding to the listener at the current listener location;

identifying a reverberant field as diminishing reflections occurring after early reflections; and using a cross fade on the identified reverberant field.

13. A system comprising:

a simulator to provide a listener's current location and attitude in a virtual space being simulated and to provide a sound source's current location and attitude in a virtual space being simulated;

a morphing engine coupled to receive a current configuration and obtain aural impulse signatures corresponding to locations and attitudes bounding the current configuration, wherein the morphing engine applies aural impulse signature morphing to the aural impulse signatures bounding the current configuration to provide intermediate aural impulse signatures corresponding to the current configuration, wherein the morphing engine identifies morph points in the bounding aural impulse signatures corresponding to early reflections, identifies corresponding data packets in the aural impulse signatures, and interpolates between morph points in the packets.

14. The system of claim 13 wherein the simulator obtains the aural impulse signatures from the morphing engine and performs convolution reverberation of sound corresponding to a listener in the current configuration.

15. The system of claim 13 wherein the morphing engine moves packets in time and patches missing data holes with residual data while adjusting RMS energy to be consistent with surrounding data.

16. The system of claim 13 wherein multiple morph points are identified.

17. The system of claim 13 wherein the simulator provides multi-dimensional information regarding degree of listener head azimuth, listener head position, degree of listener body azimuth, sound source position and sound source directionality for a listener in the simulation.

* * * * *